United States Patent
Du et al.

(10) Patent No.: US 12,131,512 B2
(45) Date of Patent: Oct. 29, 2024

(54) PRODUCT POSITIONING METHOD

(71) Applicant: GUANGDONG LYRIC ROBOT AUTOMATION CO., LTD., Huizhou (CN)

(72) Inventors: Yixian Du, Huizhou (CN); Gang Wang, Huizhou (CN); De Chen, Huizhou (CN); Jinjin Shi, Huizhou (CN)

( * ) Notice: Subject to any disclaimer, the term of this patent is extended or adjusted under 35 U.S.C. 154(b) by 379 days.

(21) Appl. No.: 17/529,417

(22) Filed: Nov. 18, 2021

(65) Prior Publication Data

US 2022/0076428 A1     Mar. 10, 2022

Related U.S. Application Data

(63) Continuation of application No. PCT/CN2019/122240, filed on Nov. 30, 2019.

(30) Foreign Application Priority Data

May 31, 2019    (CN) .......................... 201910471702.0

(51) Int. Cl.
    *G06V 10/24*        (2022.01)
    *G06T 7/12*         (2017.01)
    (Continued)

(52) U.S. Cl.
    CPC .............. *G06V 10/245* (2022.01); *G06T 7/12* (2017.01); *G06T 7/13* (2017.01); *G06T 7/168* (2017.01);
    (Continued)

(58) Field of Classification Search
    CPC .... G06V 10/245; G06V 10/7715; G06T 7/12; G06T 7/13; G06T 7/168; G06T 7/194
    See application file for complete search history.

(56) References Cited

U.S. PATENT DOCUMENTS 11,763,113 B2 *   9/2023   Rodriguez ........... G06V 10/464
                                                                235/383

FOREIGN PATENT DOCUMENTS

CN        101520841 A      9/2009
CN        104718428 B  * 10/2017  ........... G06K 9/4604
(Continued)

OTHER PUBLICATIONS

"Xiaowei Zheng et. al., A Fast Adaptive Binarization Method Based on Sub Block OSTU and Improved Sauvola, Sep. 2011, 2011 7th International Conference on Wireless Communications, Networking and Mobile Computing" (Year: 2011).*
(Continued)

*Primary Examiner* — Andrae S Allison
*Assistant Examiner* — Phuong Hau Cai
(74) *Attorney, Agent, or Firm* — Hemisphere Law, PLLC; Zhigang Ma

(57) ABSTRACT

A product positioning method includes collecting a product image of a product, dividing the product image into a plurality of rectangular regions, performing integral image calculation on each rectangular region to obtain a plurality of integral images, forming n integral image regions each having four said integral images with two adjacent sides of each of the four said integral images connecting with one side of other two images of the four said integral images, numbering the four said integral images clockwise or counterclockwise, performing differential calculation on each integral image region to obtain a differential value according to the four said integral images, obtaining coordinates of a vertex of the product according to the differential values, and performing position correction on the product image according to obtained coordinates of the vertex and coordinates of a target vertex.

9 Claims, 6 Drawing Sheets

(51) Int. Cl.
  *G06T 7/13* (2017.01)
  *G06T 7/168* (2017.01)
  *G06T 7/194* (2017.01)
  *G06V 10/77* (2022.01)
  *G06V 20/69* (2022.01)

(52) U.S. Cl.
  CPC .......... *G06T 7/194* (2017.01); *G06V 10/7715* (2022.01); *G06V 20/69* (2022.01); *G06V 20/693* (2022.01)

(56) References Cited

FOREIGN PATENT DOCUMENTS

| | | | |
|---|---|---|---|
| CN | 108564557 A | | 9/2018 |
| CN | 109741273 A | * | 5/2019 |
| CN | 110188756 A | | 8/2019 |
| CN | 110188756 B | | 2/2021 |
| EP | 3832540 A1 | | 6/2021 |
| WO | 2020238116 A1 | | 12/2020 |

OTHER PUBLICATIONS

"Xiaowei Xu et. al., A Method of Multi-view Vehicle License Plates Location Based on Rectangle Features, Nov. 2006, 2006 8th International Conference on Signal Processing" (Year: 2006).*
SIPO, Search Report and First Notice of Review Opinion, App. No. 201910471702.0.

* cited by examiner

PRODUCT POSITIONING METHOD

CROSS-REFERENCE TO RELATED APPLICATION

The present application is a continuation of PCT application No. PCT/CN2019/122240, filed on Nov. 30, 2019, which designates United States and claims priority of China Patent Application No. 201910471702.0, filed on May 31, 2019 which is incorporated herein by reference.

BACKGROUND OF THE INVENTION

1. Technical Field

The present invention relates to the technical field of product positioning, in particular to a product positioning method.

2. Description of Related Art

Currently common product positioning methods mainly include a template matching algorithm and an image edge extraction algorithm. No matter the template matching algorithm or the image edge extraction algorithm, the accuracy of product positioning depends on imaging quality of a product image. That is to say, when focusing, background light rays during photographing and so on, or the current of a phototube of a device such as a camera used for collecting images is unsuitable, the product image quality will be influenced, thereby influencing the accuracy of the product positioning.

BRIEF DESCRIPTION OF THE SEVERAL VIEWS OF THE DRAWINGS

The foregoing and other exemplary purposes, aspects and advantages of the present invention will be better understood in principle from the following detailed description of one or more exemplary embodiments of the invention with reference to the drawings, in which.

Figure 1:
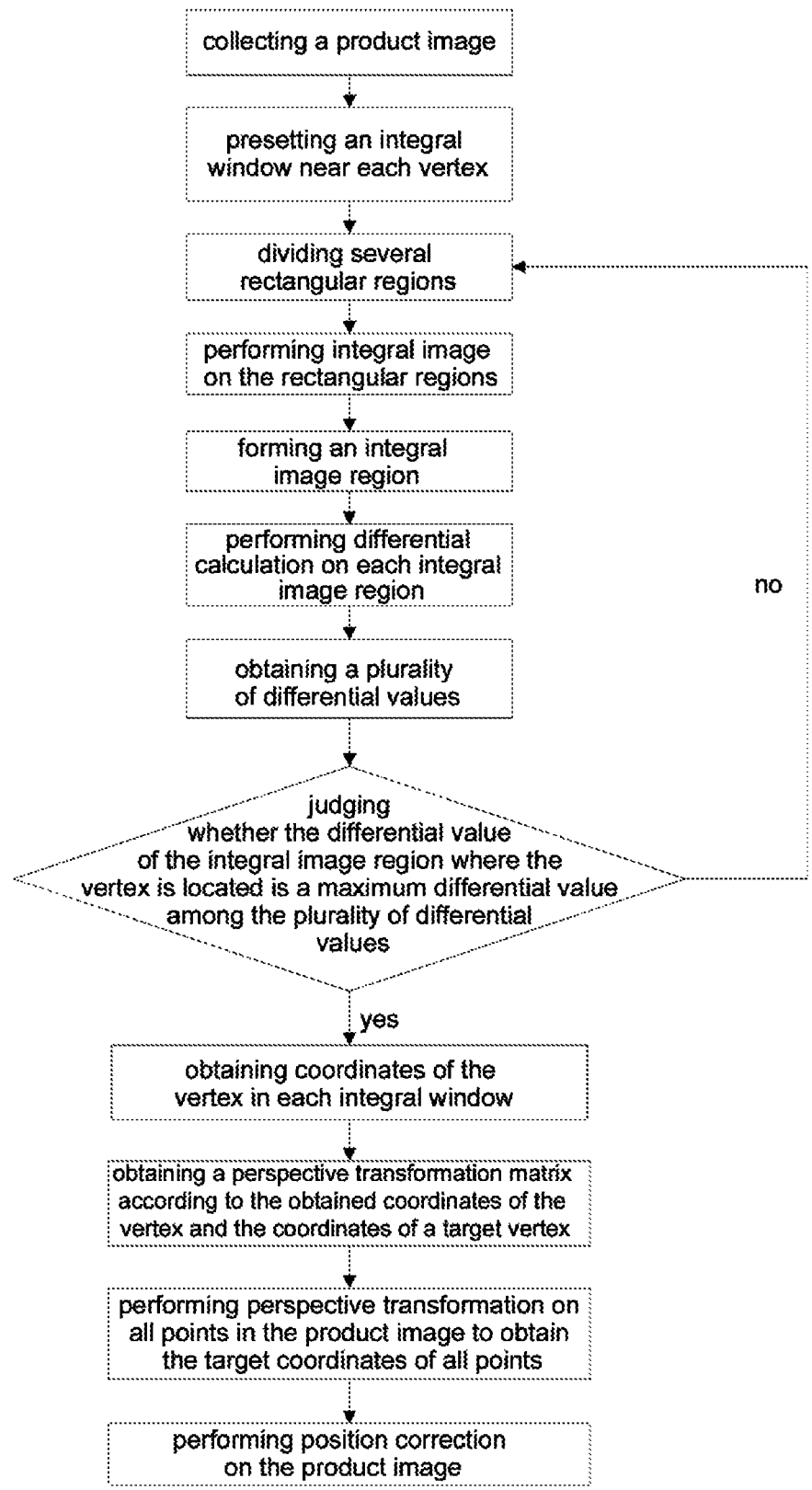
FIG. 1 is a flow chart of cell positioning in a first embodiment.

Illustration of reference signs: 10. cell image; 101. vertex; 102. background image; 103. core image; 20. integral window; 201. first rectangular region; 202. first integral image region; 203. second rectangular region; 204. second integral image region.

DETAILED DESCRIPTION OF THE INVENTION

The invention will now be described in detail through several embodiments with reference to the accompanying drawings.

For the purpose of clarity of description, many practical details will be described together in the following description. It should be understood, however, that these practical details are not intended to limit the present invention. That is to say, in some embodiments of the present invention, these practical details are unessential. Moreover, for simplification of the drawings, some customary and conventional structures and components will be depicted in a simple schematic manner in the drawings.

Besides, descriptions such as "first", "second", if involved in the present invention, are merely for descriptive purpose, but should not particularly refer to order or subsequence, and are not used to limit the present invention, and they are merely used for distinguishing components or operations described by the same technical term, but should not be construed as indicating or implying importance in the relativity or suggesting the number of a related technical feature. Thus, defining a feature with "first" or "second" may explicitly or implicitly mean that at least one such feature is included. In addition, the technical solutions of various embodiments may be combined with each other, but must be based on the fact that they can be realized by a person of ordinary skill in the art. When the combinations of the technical solutions contradict each other or cannot be realized, it should be considered that such combinations of the technical solutions do not exist, and are beyond the scope of protection claimed in the present invention.

The following two embodiments respectively provide a product positioning method, and the two embodiments describe positioning of a cell. In a cell processing technology, for example, before detecting the appearance quality of a part of the cell, the cell needs to be positioned first, and it is judged whether the cell is placed in a suitable position, so as to facilitate the subsequent cell appearance quality detection.

First Embodiment

Referring to what is shown in FIG. 1, it is a flow chart of cell positioning, and as shown in the drawing, a cell positioning method includes: collecting a cell image 10, wherein a cell may be photographed using a CCD vision system to form a cell image 10, or the cell image 10 may be collected using an image sensor.

Figure 2:
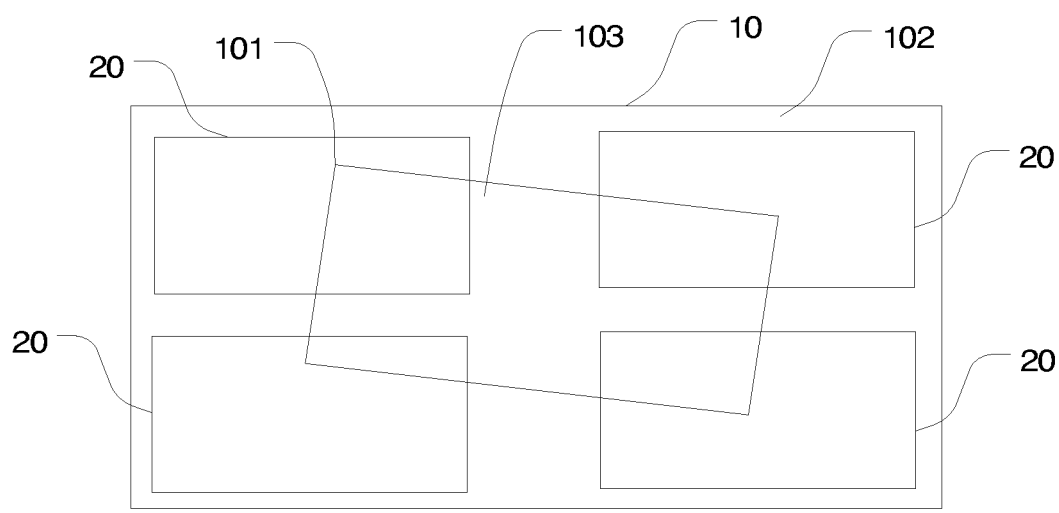
FIG. 2 is a schematic view of integral image calculation in an integral window in the first embodiment.

After completing the collection of the cell image 10, integral image calculation is performed on the cell image 10, wherein an integral image calculation process is as follows:

Referring to what is shown in FIG. 2, it is a schematic view of integral image calculation in an integral window. An integral window 20 is preset near each vertex 101 of the cell image 10, that is, an integral window 20 is preset approximately at the position of each vertex 101 of the cell image 10, without considering the precise position of the vertex 101, so that even if the quality of the cell image 10 is not high, it is only necessary to preliminarily estimate an approximate position of the vertex 101, to enable the pre-estimated position of the vertex 101 to be located in the integral window 20, wherein the size of the preset integral window 20 is not limited, and may be adjusted according to actual needs. When the size of the integral window 20 is adjusted, the cell image 10 outside the integral window 20 has less interference on the cell image 10 inside the integral window 20.

Figure 3:
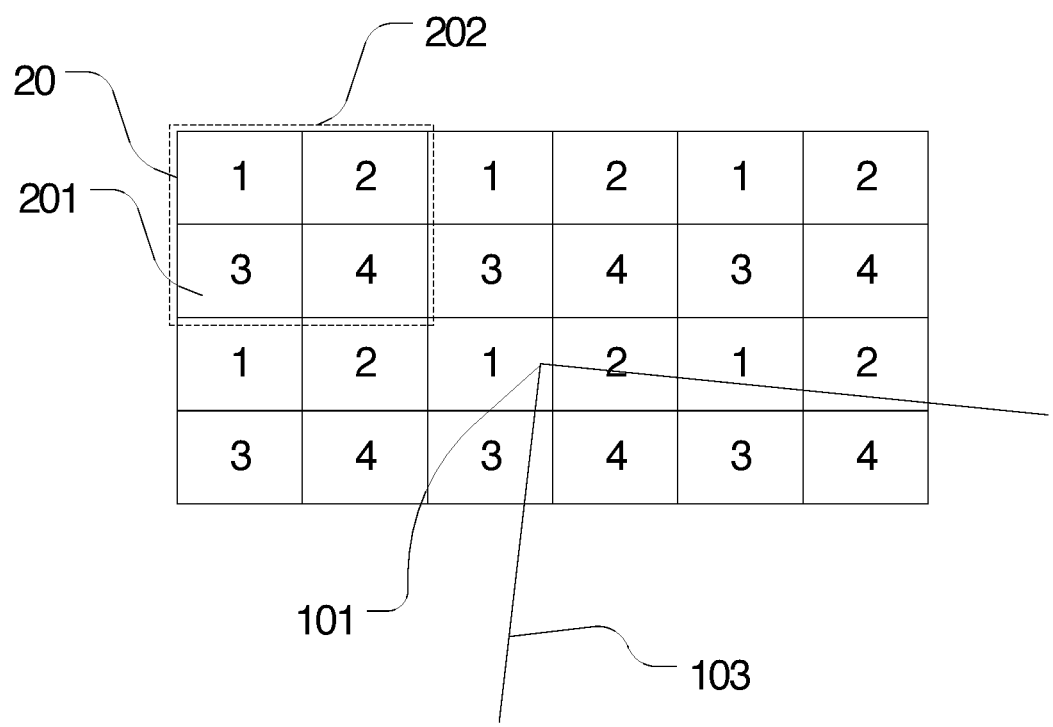
FIG. 3 is a schematic view of integral image calculation in an integral window at an upper left corner of a cell image in the first embodiment.

Then, the integral image calculation is performed on the cell image 10 included in each integral window 20, wherein the cell image 10 included in each integral window 20 includes a background image 102 and a core image 103, the vertex 101 is located at a boundary between the core image 103 and the background image 102, the integral image calculation is performed on the cell image 10 in the integral window 20 by presetting the integral window 20, thus reducing an integral image calculation region, and improving the calculation efficiency. Undoubtedly, the integral window 20 may not be provided, and the integral image calculation is performed on the whole cell image 10, thus, the calculation efficiency is relatively low. When the integral image calculation is performed on the cell image 10 in each integral window 20, it is performed specifically in a following manner: referring to what is shown in FIG. 3, it is a schematic view of integral image calculation in an integral window at an upper left corner of the cell image, wherein the cell image 10 in each integral window 20 is divided into several first rectangular regions 201, and the integral image calculation is performed on each first rectangular region 201 in each integral window 2, to obtain an integral image of each first rectangular region 201 in each integral window 20, then the integral image of the cell image 10 included in each integral window 20 may be obtained.

In the above, a process of performing the integral image calculation on each first rectangular region 201 is as follows:
using s(x, y) to represent a sum of all cell images 10 of each pixel (x, y) in a y direction in each first rectangular region 201, with initial s(x, −1)=0;
using ii(x, y) to represent an integral image, with initial ii(−1, x)=0; scanning the cell image 10 in each first rectangular region 201 row by row, and recurrently calculating the sum s(x, y) of all cell images 10 of each pixel (x, y) in the y direction and a value of the integral image ii(x, y):

$$s(x,y)=s(x,y-1)+i(x,y);$$

$$ii(x,y)=ii(x-1,y)+s(x,y);$$

scanning the cell images 10 in each first rectangular region 201 row by row, wherein when reaching a lower right corner pixel of the cell image 10 in each first rectangular region 201, construction of the integral image ii(x, y) is completed.

After traversing the cell images 10 of each first rectangular region 201 in the integral window 20, the sum of pixel values of any first rectangular region 404 in the integral window 20 may be completed by an addition/subtraction operation, regardless of the area of the first rectangular region 201, and the larger the cell image 10 in the first rectangular region 201 is, the more time is saved, thereby improving the operation efficiency.

Continuing to refer to FIG. 3, after the integral image of each first rectangular region 201 in each integral window 20 is obtained, the coordinates of each vertex 101 in the product image are acquired through differential calculation. Specifically, four first rectangular regions 201 arranged clockwise or counterclockwise in each integral window 20 form a first integral image region 202, and the vertex 101 is located in one of the first integral image regions 202.

Performing differential calculation on each first integral image region 202 to obtain a plurality of first differential values, wherein differential calculation formulas of the first integral image regions 202 in different positions are different, and the differential calculation formulas are as follows:
in the integral window 20 near the upper left corner vertex 101 of the cell image 10, the differential calculation formula of the plurality of first integral image regions 202 is: (R1−R4)−(R3−R2);
in the integral window 20 near the upper right corner vertex 101 of the cell image 10, the differential calculation formula of the plurality of first integral image regions 202 is: (R2−R3)−(R4−R1);
in the integral window 20 near the lower left corner vertex 101 of the cell image 10, the differential calculation formula of the plurality of first integral image regions 202 is: (R3−R2)−(R4−R1);
in the integral window 20 near the lower right corner vertex 101 of the cell image 10, the differential calculation formula of the plurality of first integral image regions 202 is: (R4−R1)−(R3−R2),
wherein Ri represents an integral image difference value of a region i in the first integral image region 202, obtained by subtracting the integral image at the upper left corner of the region i from the integral image at the lower right corner of the region i.

After the first differential values of the plurality of first integral image regions 202 in each integral window 20 is calculated, it is judged whether the first differential value of the first integral image region 202 where the corresponding vertex 101 is located is a maximum differential value among the plurality of first differential values.

If yes, coordinates of the vertex 101 in each integral window 20 are obtained according to the maximum differential value among the plurality of first differential values.

For the integral window 20 at the upper left corner, the first differential values of the plurality of first integral image regions 20 in the integral window 20 at the upper left corner are calculated according to (R1−R4)−(R3−R2), and it is judged whether the first differential value of the first integral image region 202 where the upper left corner vertex 101 is located is the maximum differential value among a plurality of first differential values, and if yes, the coordinates of the vertex 101 in the integral window 20 at the upper left corner are obtained according to the maximum differential value among the plurality of first differential values. For the integral window 20 at the upper right corner, the first differential values of the plurality of first integral image regions 20 in the integral window 20 at the upper right corner are calculated according to (R2−R3)−(R4−R1), and it is judged whether the first differential value of the first integral image region 202 where the upper right corner vertex 101 is located is the maximum differential value among a plurality of first differential values, and if yes, the coordinates of the vertex 101 in the integral window 20 at the upper right corner are obtained according to the maximum differential value among the plurality of first differential values. For the integral window 20 at the lower left corner, the first differential values of the plurality of first integral image regions 20 in the integral window 20 at the lower left corner are calculated according to (R3−R2)−(R4−R1), and it is judged whether the first differential value of the first integral image region 202 where the lower left corner vertex 101 is located is the maximum differential value among a plurality of first differential values, and if yes, the coordinates of the vertex 101 in the integral window 20 at the lower left corner are obtained according to the maximum differential value among the plurality of first differential values. For the integral window 20 at the lower right corner, the first differential values of the plurality of first integral image regions 20 in the integral window 20 at the lower right corner are calculated according to (R4−R1)−(R3−R2), and it is judged whether the first differential value of the first integral image region 202 where the lower right corner vertex 101 is located is the maximum differential value among a plurality of first differential values, and if yes, the coordinates of the vertex 101 in the integral window 20 at the lower right corner are obtained according to the maximum differential value among the plurality of first differential values.

Referring to FIG. 3 again, the cell image 10 in the integral window 20 located near the upper left corner vertex 101 of the cell image 10 is divided into several first rectangular regions 201, and four first rectangular regions 201 arranged clockwise or counterclockwise to each other form the first integral image region 202, each first integral image region 202 is constituted by four first rectangular regions 201. In order to facilitate performing the integral image differential calculation, the four first rectangular regions 201 are identified by region 1, region 2, region 3 and region 4, respectively. In the present example, assume that each integral window 20 is collectively divided into 24 first rectangular regions 201, that is, six first integral image regions 202. The first differential values of the six first integral image regions 202 are calculated according to the formula (R1−R4)−(R3−R2), respectively. After completing the calculation of the first differential values of the six first integral image regions 202, six first differential values are obtained, and magnitudes of the six first differential values are compared, to obtain a maximum differential value among the six first differential values, then, it is judged whether the maximum differential value among the six first differential values is the first differential value of the first integral image region 202 where the vertex 101 is located, and if yes, a center position of the first integral image region 202 corresponding to the maximum differential value among the six first differential values is the position of the upper left corner vertex 101 of the cell image 10.

If the first differential value of the first integral image region 202 where the vertex 101 is located is not the maximum differential value among the plurality of first differential values, the division manner of the cell image 10 in each integral window 20 needs to be modified, so as to meet the requirement that the differential value of the integral image region where the vertex is located is the maximum differential value among the plurality of differential values. The positions of the other three vertexes 101 are determined by the same method as that for determining the position of the upper left corner vertex 101 of the cell image 10, which will not be described in detail herein.

Figure 4:
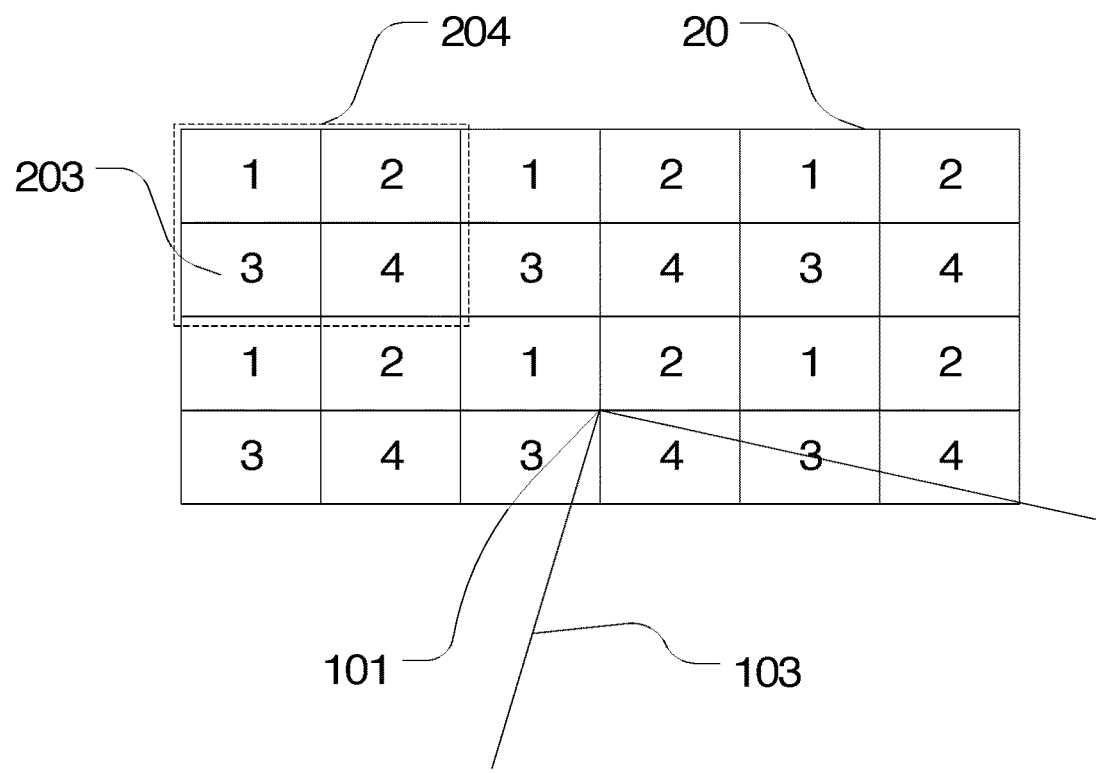
FIG. 4 is a schematic view of integral image calculation in the integral window at the upper left corner of the cell image after modification in the first embodiment.

Specifically, referring to FIG. 4, it is a schematic view of integral image calculation of the integral window at the upper left corner of the cell image after modification, and modifying the division manner of the cell image 10 in each integral window 20 includes:

redividing the cell image 10 in each integral window 20 into several second rectangular regions 203;
  performing integral image calculation on each second rectangular region 203 in each integral window 20 to obtain an integral image of each second rectangular region 203 in each integral window 20;
  forming a second integral image region 204 with four second rectangular regions 203 arranged clockwise or counterclockwise in each integral window 20,
  wherein the vertex 101 is located in one of the second integral image regions 204; performing differential calculation on each second integral image region 204 to obtain a plurality of second differential values;
  judging whether the second differential value of the second integral image region 204 where the vertex 101 is located is the maximum differential value among the plurality of second differential values, wherein
  if yes, coordinates of the vertex 101 in the corresponding integral window 20 are obtained according to the maximum differential value among the plurality of second differential values, and if not, the above modifying process is repeated until the differential value of the integral image region where the vertex 101 is located is the maximum differential value among the plurality of differential values.

Figure 5:
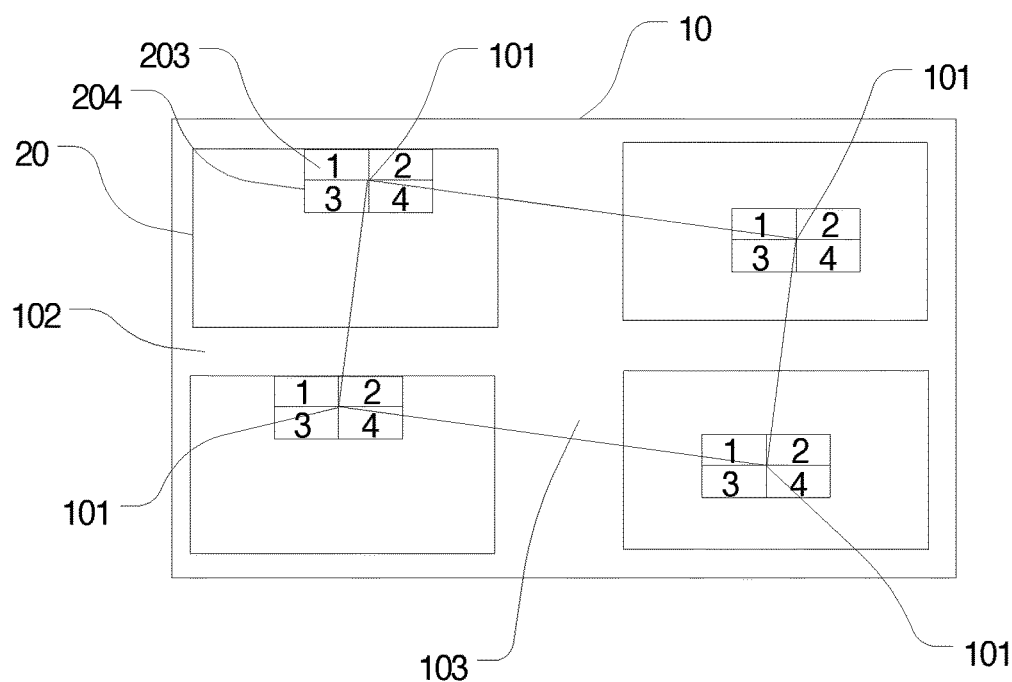
FIG. 5 is a schematic view of calculation in each integral window of the cell image after modification in the first embodiment.

Referring to FIG. 4 again, through continuous modification, it is finally satisfied that the differential value of the integral image region where the vertex 101 is located is the maximum differential value among the plurality of differential values. However, only when the four vertices 101 of the cell image 10 are respectively located at the center position of the integral image region formed by the four rectangular regions, the differential value of the integral image region where the vertex 101 is located is the maximum differential value among the plurality of differential values. In the above, the position of the vertex 101 of the cell image 10 at the upper left corner is analyzed. Referring to FIG. 4 again, in the collected cell image 10, the cell image 10 includes a background image 102 and a core image 103 surrounded by the background image 102. In each integral window 20, the cell image 10 includes a part of the background image 102 and a part of the core image 103. As the core image 103 is darker relative to the background image 102, that is, as shown in FIG. 4, the background image 102 in the rectangular region where region 1, region 2 and region 3 at the upper left corner are located is relatively bright with respect to the cell image 10 where the region 4 is located, the differential calculation is performed through (R1−R4)−(R3−R2), and when the differential value is the maximum, only when the upper left corner vertex 101 of the cell image 10 is located at the center position of the integral image region, the differential value is the maximum, therefore, a point corresponding to the center position of the integral image region is the vertex 101 at the upper left corner of the cell image 10. In other words, when the differential value of the integral image region where the vertex 101 is located is the maximum differential value among the plurality of differential values, the vertex 101 should be located at the center position of the integral image region, and the accurate position of the vertex 101 may be obtained as long as the center position of the integral image region is obtained, and the coordinates of the vertex 101 are calculated. Referring to FIG. 5, it is a schematic view of calculation of each integral window 20 of the cell image 10 after modification. The coordinates of the upper right corner vertex 101, the coordinates of the lower left corner vertex 101 and the coordinates of the lower right corner vertex 101 of the cell image 10 are all located at the center positions of the corresponding integral image regions, accordingly, the center positions of the corresponding integral image regions are the positions of the corresponding vertices 101, specifically, the method for obtaining the coordinates of the upper right corner vertex 101, the coordinates of the lower left corner vertex 101 and the coordinates of the lower right corner vertex 101 is the same as the method for obtaining the coordinates of the upper left corner vertex 101 of the cell image 10, which will not be described in detail in the present example. In other words, after the first rectangular region 201 in each integral window 20 is modified, in each integral window 20, the differential value of the second integral image region 204 where the vertex 101 in the corresponding integral window 20 is located is the maximum differential value among the plurality of differential values of the plurality of second integral image regions 204 in each integral window 20, and the vertex 101 is located at a center position of the second integral image region 204.

After positioning the cell image 10, in order to facilitate the subsequent process, the position of the cell image 10 further needs to be modified. Referring to FIG. 1 again, after acquiring the coordinates of each vertex 101, the method further includes: performing position correction on the cell image 10 according to the obtained coordinates of each vertex 101 and the coordinates of a target vertex 101. The coordinates of the target vertex 101 are preset first, that is, the coordinates of each target vertex 101 of the cell image 10 are determined according to the position that facilitates performing the next process on the cell, a perspective transformation matrix is obtained according to the obtained coordinates of each vertex 101 and the coordinates of the target vertex 101, the position correction is performed on the cell image 10 according to the obtained perspective transformation matrix, and the position correction is performed on the cell.

In the above, the perspective transformation process may be represented by the following formula: u, v, and w are coordinates of each vertex 101 in the cell image 10 obtained by positioning, x', y', and w' are coordinates of the target vertex 101, and according to the principle that two points determine one straight line, as the coordinates of each vertex 101 in the cell image 10 are determined, based on the obtained coordinates of each vertex 101, the coordinates of all points in the cell image 10 may be calculated and obtained, and the perspective transformation matrix is applied to all points in the cell image 10, as shown below:

$$[x', y', w'] = [u, v, w] \begin{bmatrix} a_{11} & a_{12} & a_{13} \\ a_{21} & a_{22} & a_{23} \\ a_{31} & a_{32} & a_{33} \end{bmatrix}$$

Figure 6:
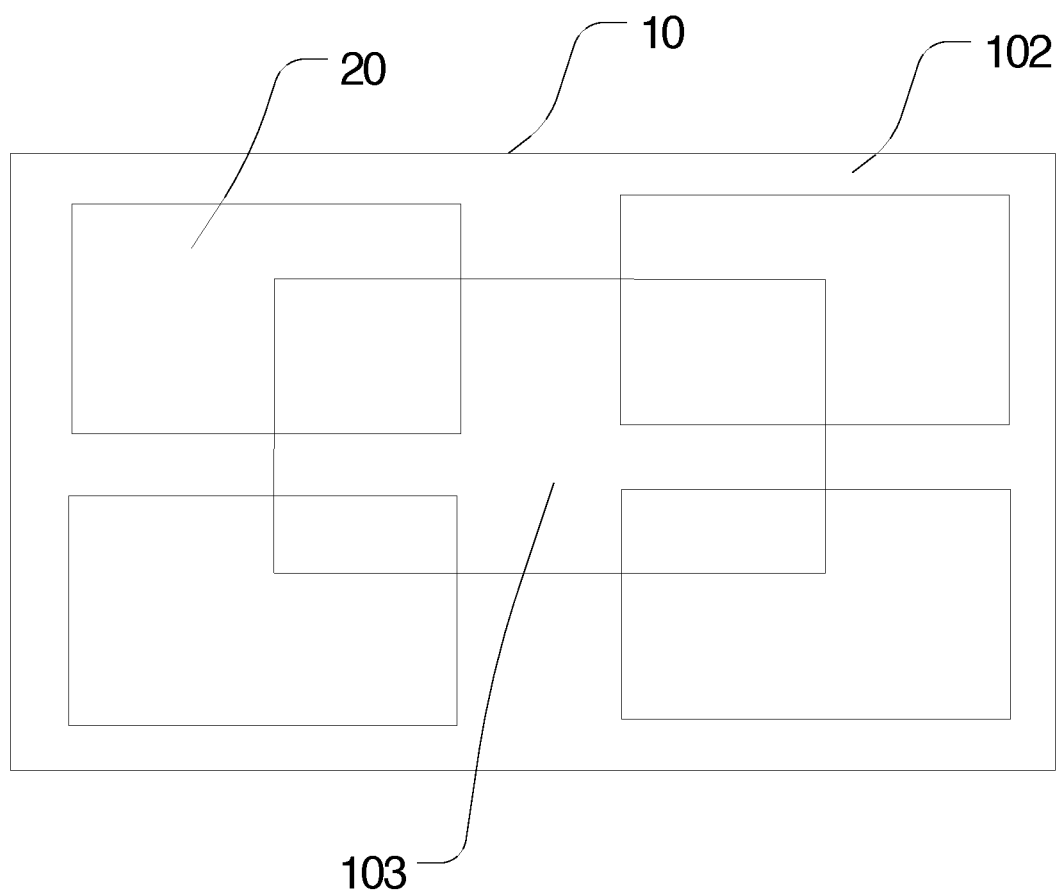
FIG. 6 is a schematic view of the cell image after correction in the first embodiment.

That is, according to the obtained perspective transformation matrix, perspective transformation is performed on the coordinates of all points in the cell image 10 to obtain target coordinates of all points in the cell image 10; according to the obtained target coordinates of all points in the cell image 10, position correction is performed on the cell. Referring to FIG. 6, it is a schematic view after the cell image 10 is modified.

In addition, it should be noted that the positioning method in the present embodiment may also be applied to the positioning of other product images, for example, positioning of regular products like triangular prismatic, cube or cuboid products, and also positioning of polygonal products having the same shape and area on two opposite end surfaces, as long as the same number of integral windows are set according to the number of vertices of end surface, that is, an integral window is disposed near each vertex of the end surface. The specific positioning method is the same as the cell image positioning method, and will not be described in detail herein.

Second Embodiment

Figure 7:
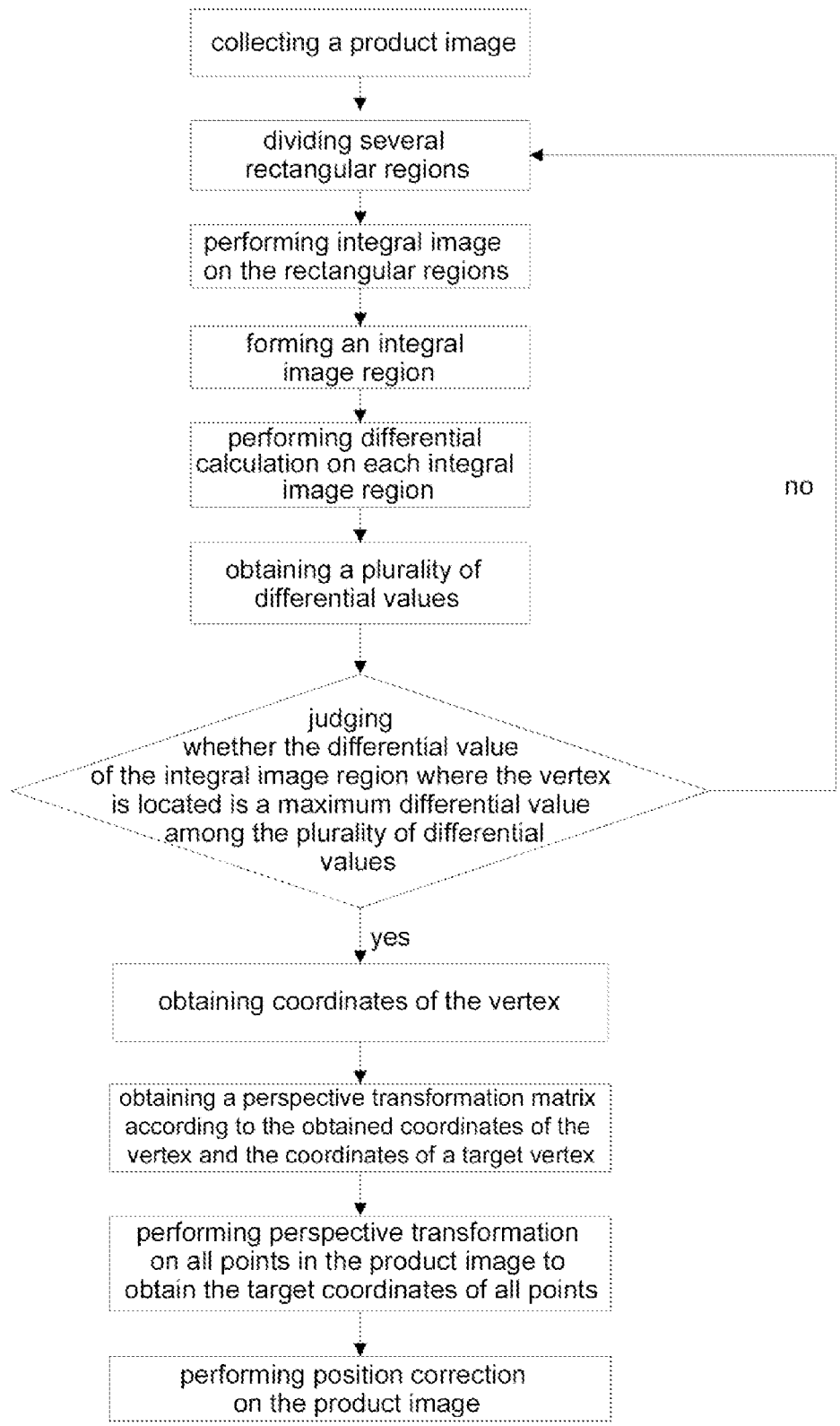
FIG. 7 is a flow chart of cell positioning in a second embodiment.
Figure 8:
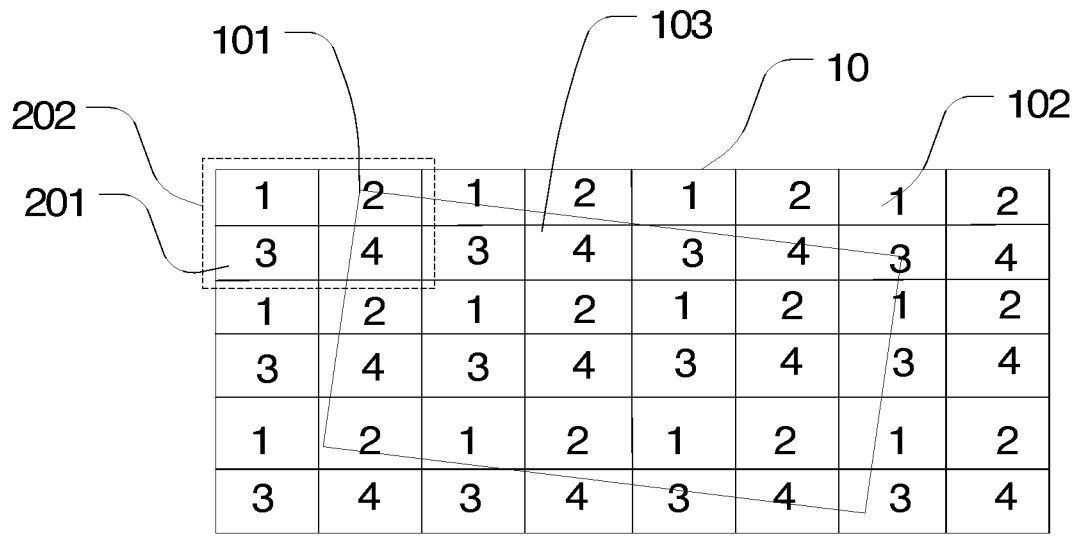
FIG. 8 is a schematic view of integral image calculation on a cell image in the second embodiment.

For a product positioning method of the second embodiment, reference is made to what is shown in FIG. 7, which is a flow chart of cell positioning in the second embodiment, and different from the first embodiment, the product positioning method in the second embodiment may be realized without presetting an integral window. As shown in FIG. 7, the cell positioning method includes: collecting a cell image 10, and after completing the collection of the cell image 10, performing integral image calculation on the cell image 10, wherein an integral image calculation process is as follows:

Referring to what is shown in FIG. 8, it is a schematic view of integral image calculation in the present example. The integral image calculation is performed on the cell image 10, and when the integral image calculation is performed on the cell image 10, it is specifically performed in a following manner: dividing the cell image 10 into several first rectangular regions 201, and performing the integral image calculation on each first rectangular region 201 to obtain an integral image of each first rectangular region 201, thereby an integral image of the cell image 10 may be obtained. In the above, the process of performing the integral image calculation on each first rectangular region 201 is the same as the process of performing the integral image calculation on each first rectangular region 201 in the first embodiment.

Continuing to refer to FIG. 8, after obtaining the integral image of each first rectangular region 201, coordinates of each vertex 101 in a product image are acquired through differential calculation. Specifically, four first rectangular regions 201 arranged clockwise or counterclockwise to each other form a first integral image region 202, and four vertices 101 are located in four different first integral image regions 202, respectively.

Performing differential calculation on each first integral image region 202 to obtain a plurality of first differential values, wherein the differential calculation formula is the same as that in the first embodiment.

After the first differential value of each first integral image region 202 is calculated, it is judged whether the first differential value of the first integral image region 202 where the corresponding vertex 101 is located is a maximum differential value among the plurality of first differential values; if yes, coordinates of the vertex 101 are obtained according to the maximum differential value among the plurality of first differential values.

In the present example, in order to calculate the positions of the four vertices 101 in the cell image 10, the method for calculating positions of the four vertices 101 is calculated according to the differential formula as follows.

After the plurality of first integral image regions 202 are formed, the position of the upper left corner vertex 101 is first searched according to the differential calculation formula (R1–R4)–(R3–R2). Specifically, the first differential value of each first integral image region 202 is calculated according to (R1–R4)–(R3–R2), subsequently, it is judged whether the first integral image region 202 where the vertex 101 is located has the maximum differential value among a plurality of first differential values, and if yes, the coordinates of the upper left corner vertex 101 are obtained according to the maximum differential value among the plurality of first differential values.

Then, the position of the upper right corner vertex 101 is searched according to the differential calculation formula (R2–R3)–(R4–R1). Specifically, the first differential value of each first integral image region 202 is calculated according to (R2–R3)–(R4–R1), subsequently, it is judged whether the first integral image region 202 where the vertex 101 is located has the maximum differential value among a plurality of first differential values, and if yes, the coordinates of the upper right corner vertex 101 are obtained according to the maximum differential value among the plurality of first differential values.

Then, the position of the lower left corner vertex 101 is searched according to the differential calculation formula (R3−R2)−(R4−R1). Specifically, the first differential value of each first integral image region 202 is calculated according to (R3−R2)−(R4−R1), subsequently, it is judged whether the first integral image region 202 where the vertex 101 is located has the maximum differential value among a plurality of first differential values, and if yes, the coordinates of the lower left corner vertex 101 are obtained according to the maximum differential value among the plurality of first differential values.

Then, the position of the lower right corner vertex 101 is searched according to the differential calculation formula (R4−R1)−(R3−R2). Specifically, the first differential value of each first integral image region 202 is calculated according to (R4−R1)−(R3−R2), subsequently, it is judged whether the first differential value of the first integral image region 202 where the vertex 101 is located is the maximum differential value among a plurality of first differential values, and if yes, the coordinates of the lower right corner vertex 101 are obtained according to the maximum differential value among the plurality of first differential values.

That is to say, in the present example, after a plurality of first integral image regions 202 are formed, the positions of each vertex 101 are sequentially confirmed according to the differential calculation formula of the four vertices 101, for example, differential calculation may be performed on each first integral image region 202 in the cell image 10 according to the differential calculation formula of the upper left corner vertex 101, to confirm the position of the upper left corner vertex 101, and after the position of the upper left corner vertex 101 is found, differential calculation is performed on each first integral image region 202 in the cell image 10 according to the differential calculation formula of the upper right corner vertex 101, to confirm the position of the upper right corner vertex 101, and after the position of the upper right corner vertex 101 is found, the differential calculation is performed on each first integral image region 202 in the cell image 10 according to the differential calculation formula of the lower left corner vertex 101, to confirm the position of the lower left corner vertex 101, and after the position of the lower left corner vertex 101 is found, the differential calculation is performed on each first integral image region 202 in the cell image 10 according to the differential calculation formula of the lower right corner vertex 101, to confirm the position of the lower right corner vertex. Certainly, the order of confirming the respective vertices 101 may be adjusted depending on the situation, which is not defined in the present example.

Referring to FIG. 8 again, the cell image 10 is divided into several first rectangular regions 201, and four first rectangular regions 201 arranged clockwise or counterclockwise to each other form the first integral image region 202, each first integral image region 202 is formed by four first rectangular regions 201. In order to facilitate performing the integral image differential calculation, four first rectangular regions 201 are identified by region 1, region 2, region 3 and region 4, respectively. In the present example, assume that 48 first rectangular regions 201, that is, 12 first integral image regions 202, are divided. The first differential values of the 12 first integral image regions 202 are calculated first according to the formula (R1−R4)−(R3−R2), respectively. After completing the calculation of the first differential values of the 12 first integral image regions 202, 12 first differential values are obtained, and magnitudes of the 12 first differential values are compared, to obtain the maximum differential value among the 12 first differential values, then, it is judged whether the maximum differential value among the 12 first differential values is the first differential value of the first integral image region 202 where one of the vertices 101 is located, and if yes, a center position of the first integral image region 202 corresponding to the maximum differential value among the 12 first differential values is the position of the upper left corner vertex 101 of the cell image 10. By the same reasoning, positions of other vertices 101 may be obtained.

If the first differential value of the first integral image region 202 where the vertex 101 is located is not the maximum differential value among the plurality of first differential values, the division manner of the cell image 10 needs to be modified so as to satisfy that the differential value of the integral image region where the vertex 101 is located is the maximum differential value among the plurality of differential values.

When the first differential value of each first integral image region 202 is calculated according to (R1−R4)−(R3−R2) so as to search for the position of the upper left corner vertex 101, the first differential value of the first integral image region 202 where the vertex 101 is located is not the maximum differential value among the plurality of first differential values, the division manner of the cell image 10 is modified until it is satisfied the first integral image region 202 where one of the vertices 101 is located is the maximum differential value among the plurality of first differential values, then, this vertex is the upper left corner vertex 101 of the cell image 10, that is, the position of the upper left corner vertex 101 is found. Subsequently, positions of the other vertices 101 are determined in the same way.

Figure 9:
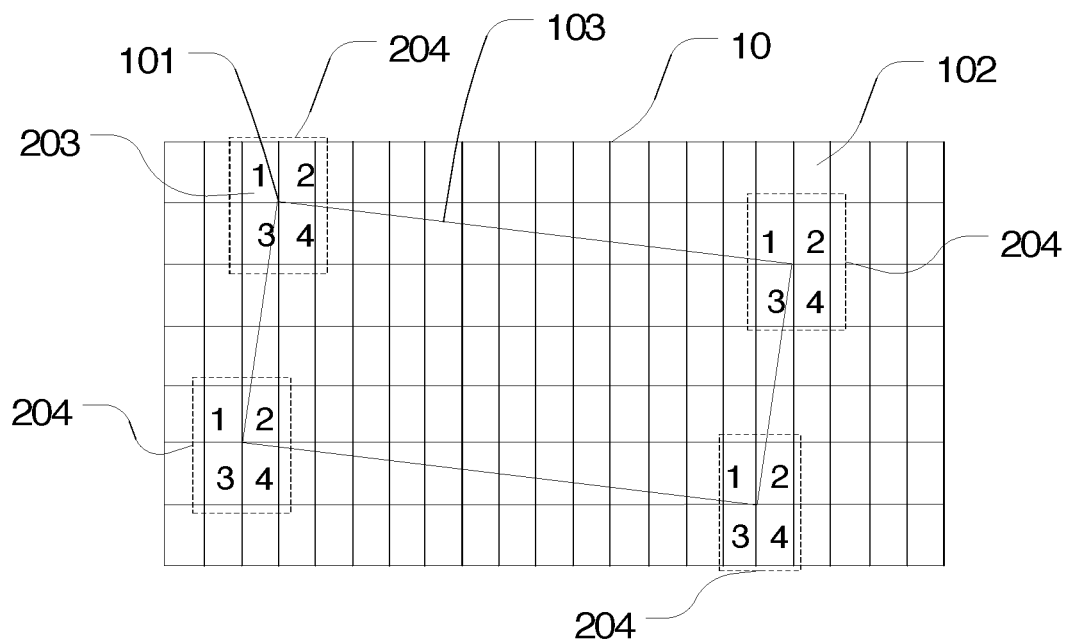
FIG. 9 is a schematic view of integral image calculation on the cell image after modification in the second embodiment.

Specifically, referring to FIG. 9, it is a schematic view of integral image calculation of the cell image after modification, and modifying the division manner of the cell image 10 includes:

redividing the cell image 10 into several second rectangular regions 203;

performing integral image calculation on each second rectangular region 203 to obtain an integral image of each second rectangular region 203;

forming a second integral image region 204 with four second rectangular regions 203 arranged clockwise or counterclockwise, wherein each vertex 101 is located in one second integral image region 204;

performing differential calculation on each second integral image region 204 to obtain a plurality of second differential values;

judging whether the second differential value of the second integral image region 204 where the vertex 101 is located is the maximum differential value among the plurality of second differential values, wherein if yes, coordinates of the corresponding vertex 101 are obtained according to the maximum differential value among the plurality of second differential values, and if not, the above modifying process is repeated until the differential value of the integral image region where the vertex 101 is located is the maximum differential value among the plurality of differential values.

When the first differential value of each first integral image region 202 is calculated according to (R1−R4)−(R3−R2) so as to search for the position of the upper left corner vertex 101, the first differential value of the first integral image region 202 where the vertex 101 is located is not the maximum differential value among the plurality of first differential values, the cell image 10 is redivided into several second rectangular regions 203, and the several second rectangular regions 203 are formed into a plurality of second integral image regions 204, the differential calculation is performed on each second integral image region 204 to obtain a plurality of second differential values, and it is judged whether the second differential value of the second integral image region where the vertex 101 is located is the maximum differential value among the plurality of second differential values, wherein if yes, the coordinates of the corresponding vertex 101 are obtained according to the maximum differential value among the plurality of second differential values, and the coordinates of the vertex 101 are coordinates of the upper left corner vertex 101, and if not, the above modifying process is repeated until the differential value of the integral image region where one of the vertices 101 is located is the maximum differential value among the plurality of differential values, to confirm the coordinates of the upper left corner vertex 101, otherwise, the modifying process is repeated. After the confirmation of the upper left corner vertex 101 is completed, the coordinates of the upper right corner vertex 101, the lower left corner vertex 101 and the lower right corner vertex 101 are confirmed in turn by the same method, and in the present example, the order of confirming the coordinates of the upper left corner vertex 101, the upper right corner vertex 101, the lower left corner vertex 101 and the lower right corner vertex 101 may be adjusted.

Through continuous modification, according to the differential calculation formula, it is finally satisfied that the differential value of the integral image region where each vertex 101 is located is the maximum differential value among the plurality of differential values. However, only when the four vertices 101 of the cell image 10 are respectively located at the center position of the integral image region formed by the four rectangular regions, the differential value of the integral image region where each vertex 101 is located is the maximum differential value among the plurality of differential values. The point corresponding to the center position of the integral image region is each vertex 101 of the cell image 10. The coordinates of the upper left corner vertex 101, the coordinates of the upper right corner vertex 101, the coordinates of the lower left corner vertex 101 and the coordinates of the lower right corner vertex 101 of the cell image 10 are all located at the center positions of the corresponding integral image regions, thus the center position of the corresponding integral image region is the position of the corresponding vertex 101.

After the cell image 10 is positioned, in order to facilitate the subsequent process, the position of the cell image 10 further needs to be modified, and in the present example, the position of the cell image 10 is modified in the same way as in the first embodiment.

In the present example, the rectangular regions need to be divided for the whole cell image, then the integral image region is formed, and the positions of the four vertices are determined in turn according to the integral image differential calculation formula of four different vertices.

In the present invention, the integral image algorithm is applied to product positioning, in this way, when the product image quality is not high, for example, when the image is blurred and it is inconvenient to position a product with the image edge algorithm or the template matching algorithm, using the integral image algorithm may quickly divide the product image and the background region, so as to position the product, without being restricted by the low image quality.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:
1. A product positioning method, comprising:
collecting a product image of a product;
dividing the product image into a plurality of rectangular regions;
performing integral image calculation on each rectangular region to obtain a plurality of integral images;
forming a plurality of integral image regions each having four said integral images with two adjacent sides of each of the four said integral images connecting with one side of other two images of the four said integral images;
numbering the four said integral images clockwise or counterclockwise of each of the integral image regions;
performing differential calculation on each of the integral image regions to obtain a differential value according to the four said integral images;
judging whether the differential value of an integral image region of the integral image regions where a vertex (101) of the product is located is a maximum differential value among obtained differential values, wherein if yes, coordinates of the vertex (101) are obtained; and
performing position correction on the product image according to obtained coordinates of the vertex (101) and coordinates of a target vertex.

2. The product positioning method according to claim 1, wherein the judging whether the differential value of the integral image region of the integral image regions where a vertex (101) of the product is located is a maximum differential value among obtained differential values, wherein if not, a division manner of the product image is modified, so that a recalculated differential value of the integral image region where the vertex (101) is located is the maximum differential value among recalculated differential values.

3. The product positioning method according to claim 2, wherein the modifying the division manner of the product image comprises redividing the product image into several rectangular regions;
then the coordinates of the vertex (101) are obtained according to the several rectangular regions.

4. The product positioning method according to claim 1, wherein the method further comprises: presetting an integral window (20) near each vertex (101) of the product image, wherein the vertex (101) is located in the integral window (20); wherein in the performing integral image calculation step, the integral image calculation is performed on each rectangular region within the integral window (20); wherein in the performing differential calculation step, the differential calculation is performed on each of the integral image regions within the integral window (20); wherein in the judging step, judging whether the differential value of the each integral image region where a vertex (101) of the product is located is a maximum differential value among the differential values obtained within the integral window (20).

5. The product positioning method according to claim 1, wherein the coordinates of the vertex (101) are coordinates of a center position of the integral image region corresponding to the maximum differential value.

6. The product positioning method according to claim 1, wherein the method further comprising: obtaining an integral image difference value Ri for each integral image by subtracting an integral value in a lower right corner of the integral image from an integral value in an upper left corner of the integral image, i being the number of the integral image; wherein each differential value is calculated according to the integral image difference values Ri of each of the integral image regions.

7. The product positioning method according to claim 1, wherein the performing position correction on the product image according to obtained coordinates of the vertex (101) and coordinates of a target vertex comprises:
  obtaining a perspective transformation matrix according to the obtained coordinates of the vertex (101) and the coordinates of the target vertex; and
  performing the position correction on the product image according to an obtained perspective transformation matrix.

8. The product positioning method according to claim 1, wherein the performing position correction on the product image according to obtained coordinates of the vertex (101) and coordinates of a target vertex comprises:
  obtaining coordinates of all points in the product image according to the obtained coordinates of each vertex (101);
  obtaining a perspective transformation matrix according to the obtained coordinates of each vertex (101) and the coordinates of the target vertex;
  performing perspective transformation on the coordinates of all points in the product image according to an obtained perspective transformation matrix, to obtain target coordinates of all points in the product image; and
  performing the position correction on the product image according to obtained the target coordinates of all points in the product image.

9. The product positioning method according to claim 1, wherein the coordinates of the target vertex is preset.

* * * * *